(12) United States Patent
Yamayose

(10) Patent No.: US 8,865,054 B1
(45) Date of Patent: Oct. 21, 2014

(54) METHOD FOR MANUFACTURING ALUMINUM-TITANATE-BASED CERAMIC HONEYCOMB STRUCTURE

(71) Applicant: Ibiden Co., Ltd., Ogaki (JP)

(72) Inventor: Kazunori Yamayose, Stuttgart (DE)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 13/872,483

(22) Filed: Apr. 29, 2013

Related U.S. Application Data

(60) Provisional application No. 61/787,291, filed on Mar. 15, 2013.

(51) Int. Cl.
*B01D 39/20* (2006.01)
*C04B 35/64* (2006.01)

(52) U.S. Cl.
CPC .................... *C04B 35/64* (2013.01)
USPC ........ 264/630; 264/176.1; 264/631; 264/632; 264/653

(58) Field of Classification Search
USPC ................ 264/176.1, 630, 631, 632, 653
See application file for complete search history.

(56) References Cited

U.S. PATENT DOCUMENTS

| | | | | |
|---|---|---|---|---|
| 6,649,244 | B2 * | 11/2003 | Hamanaka et al. | 428/116 |
| 7,638,086 | B2 * | 12/2009 | Ito et al. | 264/630 |
| 7,695,671 | B2 * | 4/2010 | Yamamura et al. | 264/630 |
| 8,268,401 | B2 * | 9/2012 | Tokumaru | 427/356 |
| 8,398,797 | B2 * | 3/2013 | Okazaki | 156/89.22 |
| 2006/0192324 | A1 * | 8/2006 | Kaneda et al. | 264/630 |
| 2006/0208397 | A1 * | 9/2006 | Ichikawa | 264/631 |
| 2011/0236625 | A1 * | 9/2011 | Kikuchi et al. | 428/116 |
| 2011/0287921 | A1 * | 11/2011 | Uoe et al. | 501/32 |

FOREIGN PATENT DOCUMENTS

| | | |
|---|---|---|
| JP | 2003-311726 | 11/2003 |
| JP | 4066316 B2 | 1/2008 |
| WO | WO2008044508 * | 4/2008 |

OTHER PUBLICATIONS

U.S. Appl. No. 13/887,638, filed May 6, 2013, Yamayose.
U.S. Appl. No. 13/872,483, filed Apr. 29, 2013, Yamayose.
U.S. Appl. No. 13/873,576, filed Apr. 30, 2013, Yamayose.
U.S. Appl. No. 13/873,379, filed Apr. 30, 2013, Yamayose.
U.S. Appl. No. 13/887,688, filed May 6, 2013, Yamayose.
U.S. Appl. No. 13/873,624, filed Apr. 30, 2013, Yamayose.
U.S. Appl. No. 13/873,763, filed Apr. 30, 2013, Yamayose.
U.S. Appl. No. 13/873,933, filed Apr. 30, 2013, Yamayose.

* cited by examiner

*Primary Examiner* — Joseph S Del Sole
*Assistant Examiner* — Nahida Sultana
(74) *Attorney, Agent, or Firm* — Oblon, Spivak, McClelland, Maier & Neustadt, L.L.P.

(57) ABSTRACT

A method for manufacturing a ceramic honeycomb structure includes kneading titania particles, alumina particles and binder such that raw material paste including the titania particles, the alumina particles and the binder is prepared, extruding the raw material paste through a die for forming a honeycomb structure such that a body made of the raw material paste and having the honeycomb structure is formed, supporting the body extruded from the die on a holder while moving the holder along extrusion direction at a moving speed relative to an extruding speed of the raw material based on a target diameter size set for the body such that the diameter of the body held by the holder changes to the target diameter size, and sintering the body having the honeycomb structure with the target diameter size such that a ceramic body having the honeycomb structure with the target diameter size is formed.

21 Claims, 10 Drawing Sheets

Cross-sectional view at line (A-A)

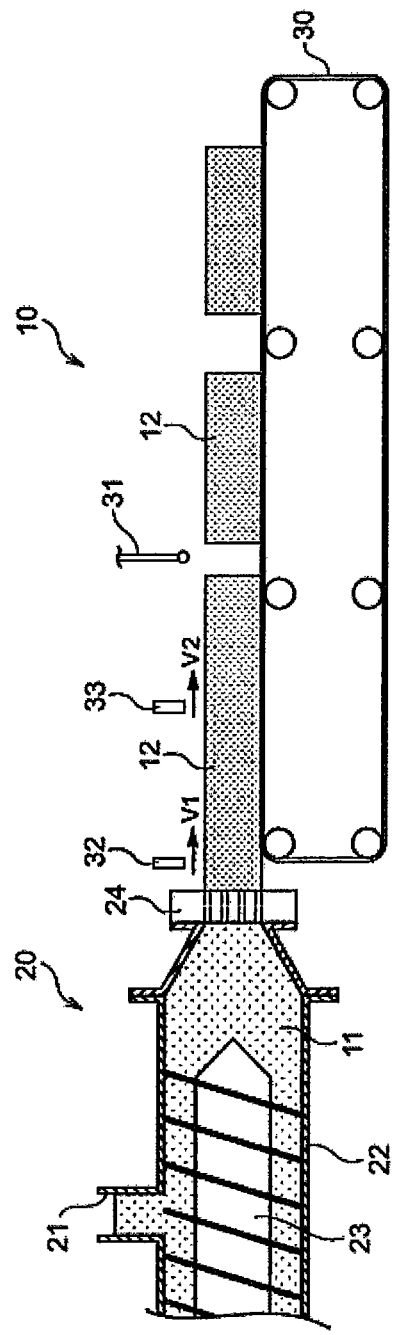

METHOD FOR MANUFACTURING ALUMINUM-TITANATE-BASED CERAMIC HONEYCOMB STRUCTURE

CROSS-REFERENCE TO RELATED APPLICATIONS

The present application is based upon and claims the benefit of priority from U.S. Application No. 61/787,291, filed Mar. 15, 2013, the entire contents of which are incorporated herein by reference.

BACKGROUND OF THE INVENTION

1. Field of the Invention

The present invention relates to a method for manufacturing an aluminum-titanate-based ceramic body with a honeycomb structure. Especially, the present invention relates to a method for manufacturing an aluminum-titanate-based ceramic body with a honeycomb structure formed by extrusion.

2. Description of Background Art

Japanese Patent No. 4066316 describes a method for manufacturing a ceramic honeycomb structure in which a ceramic body is formed by downward extrusion from an extruding apparatus through a die, and in which the speed of extruding the ceramic body is set at 1 mm/s~100 mm/s.

Japanese Laid-Open Patent Publication 2003-311726 also describes a method for manufacturing a honeycomb structure. In this manufacturing method, as a honeycomb structure becomes longer due to extrusion, the open end surface of its cells is received by a holder which exerts a pressure smaller than the compression force at the end surface at the contact, and the holder moves at a speed that can maintain that pressure along the same direction.

The entire contents of Japanese Patent No. 4066316 and Japanese Laid-Open Patent Publication 2003-311726 are incorporated herein by reference.

SUMMARY OF THE INVENTION

According to one aspect of the present invention, a method for manufacturing a ceramic honeycomb structure includes kneading titania particles, alumina particles and a binder such that a raw material paste including the titania particles, the alumina particles and the binder is prepared, extruding the raw material paste through a die for forming a honeycomb structure such that a body made of the raw material paste and having the honeycomb structure is formed, supporting the body extruded from the die on a holder while moving the holder along an extrusion direction at a moving speed relative to an extruding speed of the raw material based on a target diameter size set for the body such that the diameter of the body held by the holder changes to the target diameter size, and sintering the body having the honeycomb structure with the target diameter size such that a ceramic body having the honeycomb structure with the target diameter size is formed.

Another aspect of the present invention is a ceramic honeycomb structural body produced by a method for manufacturing a ceramic honeycomb structure including kneading titania particles, alumina particles and a binder such that a raw material paste including the titania particles, the alumina particles and the binder is prepared, extruding the raw material paste through a die for forming a honeycomb structure such that a body made of the raw material paste and having the honeycomb structure is formed, supporting the body extruded from the die on a holder while moving the holder along an extrusion direction at a moving speed relative to an extruding speed of the raw material based on a target diameter size set for the body such that the diameter of the body held by the holder changes to the target diameter size, and sintering the body having the honeycomb structure with the target diameter size such that a ceramic body having the honeycomb structure with the target diameter size is formed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a view schematically showing an example of an extrusion apparatus to be used for a forming step according to a first embodiment of the present invention;

DETAILED DESCRIPTION OF THE EMBODIMENTS

Figure 1:
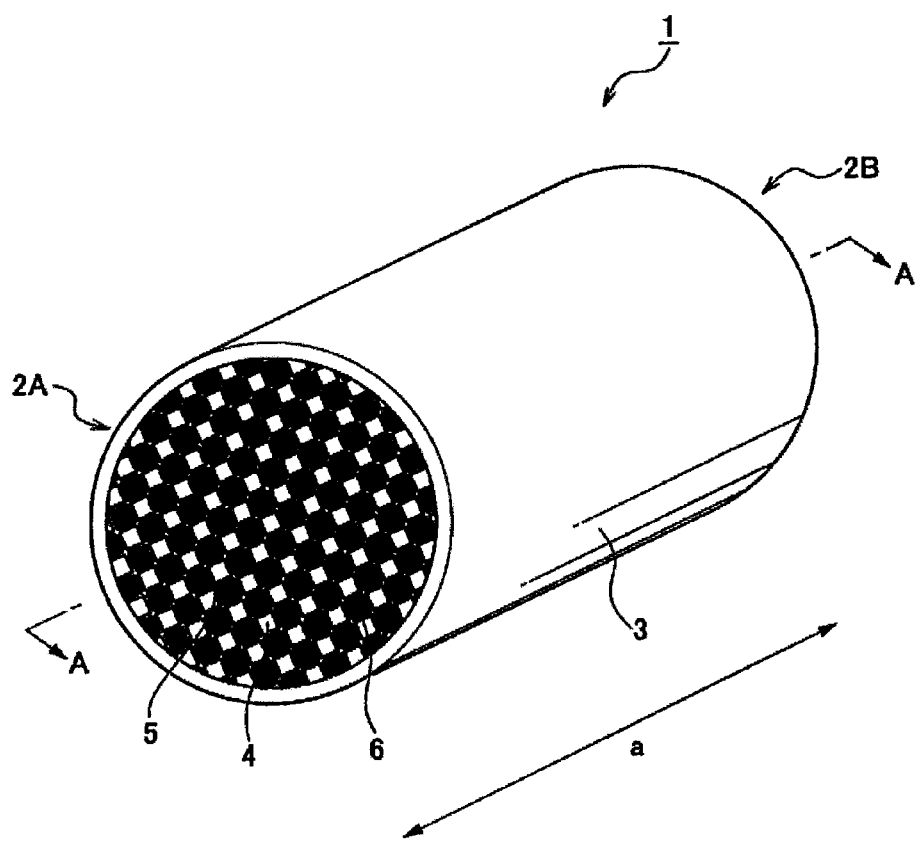
FIG. 1 is a perspective view schematically showing an example of a ceramic body with a honeycomb structure obtained by the manufacturing method according to an embodiment of the present invention.

The embodiments will now be described with reference to the accompanying drawings, wherein like reference numerals designate corresponding or identical elements throughout the various drawings.

FIG. 1 is a perspective view schematically showing an example of a ceramic body with a honeycomb structure obtained by the manufacturing method according to an embodiment of the present invention.

As shown in FIG. 1, a ceramic honeycomb structure according to an embodiment of the present invention is made of aluminum-titanate-based ceramic body 1 (aluminum-titanate-based sintered body), for example. Ceramic body 1 has two open end surfaces (2A, 2B) and side surface 3. Also, ceramic body 1 has multiple cells made of through-holes 4 and partitions 5 which section off through-holes 4. Through-holes 4 extend from end surface (2A) to end surface (2B) along a longitudinal direction of ceramic body 1 (direction along arrow (a) in FIG. 1), and through-holes 4 are sectioned by partitions 5. In addition, either end of a through-hole 4 in a longitudinal direction (a) is sealed by sealant 6, while the other end is left open. Thus, through-hole 4 is sealed by sealant 6 only at either end. As shown in FIG. 1, end surfaces (2A, 2B) of ceramic body 1 are in a checkered pattern where predetermined portions are alternately sealed. However, end surfaces (2A, 2B) of ceramic body 1 are not limited to such a pattern and may be in any other sealant pattern.

The shape of ceramic body 1 may also be an elliptic cylinder, a rectangular prism or a polygonal prism instead of a circular cylinder as shown in FIG. 1.

Figure 2:
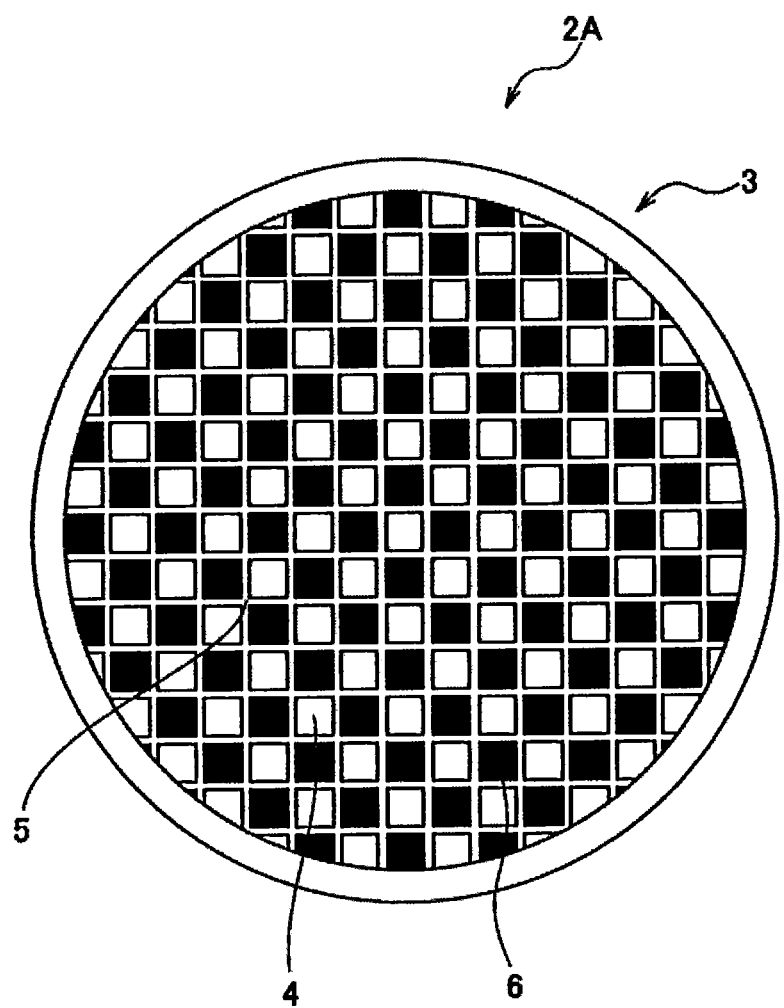
FIG. 2 is a view showing an end surface of the ceramic body with a honeycomb structure shown in FIG. 1.

FIG. 2 is a view showing an end surface of ceramic body 1 with a honeycomb structure shown in FIG. 1.

Through-holes 4 are sectioned off by partitions 5 at end surface (2A) of ceramic body 1 as shown in FIG. 2. Also, some end portions of through-holes 4 are sealed by sealant 6 while others are not sealed by sealant 6 and remain open as shown in FIG. 2. Namely, through-hole 4 is sealed by sealant 6 only at either end. Every alternate predetermined portion at end surface (2A) of ceramic body 1 is sealed so as to form a checkered pattern.

Figure 3:
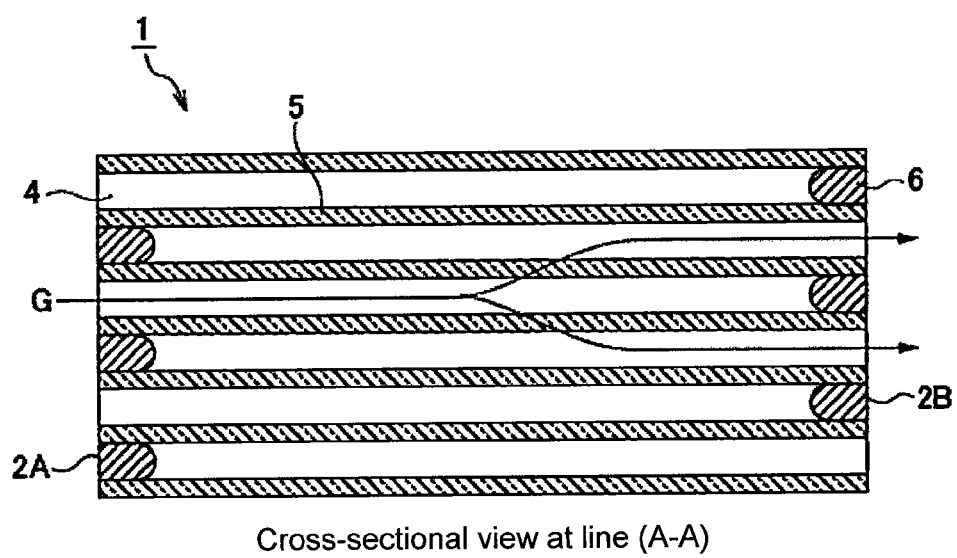
FIG. 3 is a cross-sectional view at line (A-A) of the ceramic body with a honeycomb structure shown in FIG. 1.

FIG. 3 is a cross-sectional view at line (A-A) of the ceramic body with a honeycomb structure as shown in FIG. 1.

As shown in FIG. 3, one end surface (2A) is positioned on the inflow side, and exhaust gas (G) (exhaust gas from a diesel engine, for example) flows into open through-holes 4, passes through partitions 5 which section off through-holes 4, and flows out from other through-holes 4 that are open at the other end surface (2B) on the outflow side. Therefore, in ceramic body 1 with a honeycomb structure according to an embodiment of the present invention, partitions 5 can function as a filter to capture particulate matter (PM) or the like, for example, as a diesel particulate filter (DPF).

Next, a method for manufacturing a ceramic honeycomb structure is described in detail according to an embodiment of the present invention.

Figure 4:
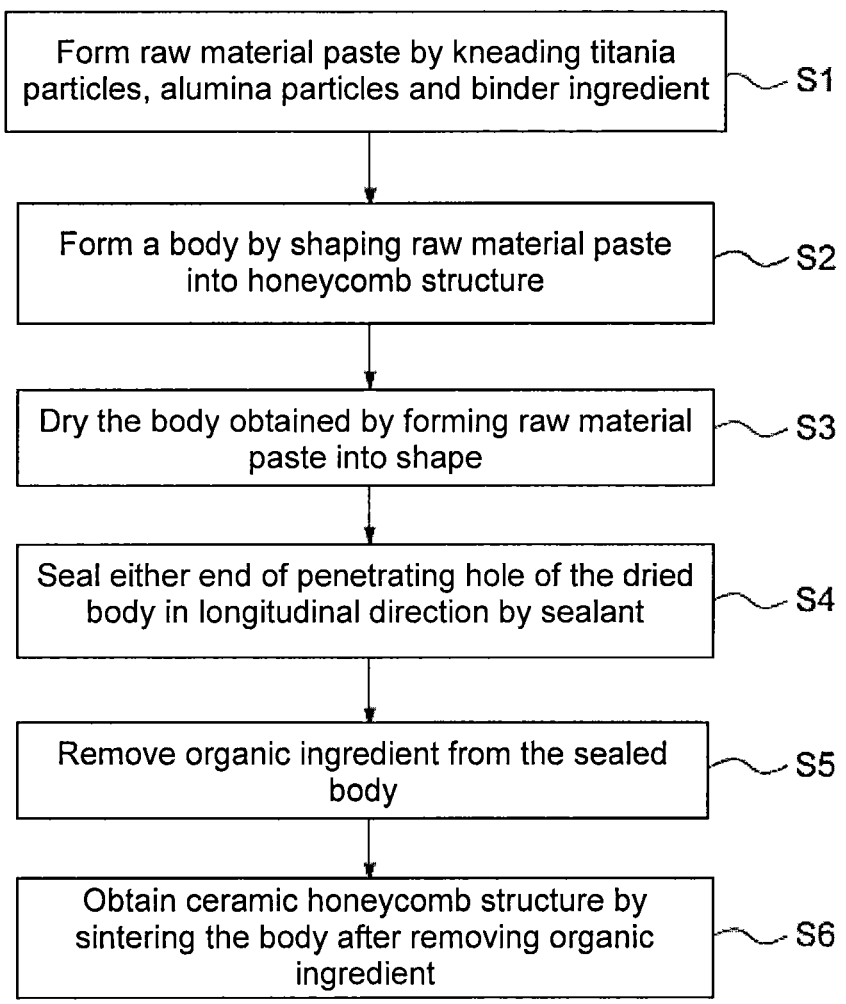
FIG. 4 is a flowchart showing an example of the manufacturing method according to an embodiment of the present invention.

FIG. 4 is a flowchart showing an example of the method for manufacturing a honeycomb structure according to an embodiment of the present invention.

An example of the method for manufacturing a ceramic honeycomb structure as shown in FIG. 4 includes the following: preparation step (S1) for preparing raw material paste by kneading titania particles, alumina particles and a binder ingredient; forming step (S2) for shaping the raw material paste into a honeycomb structure to form a body; drying step (S3) for drying the body shaped from the raw material paste; sealing step (S4) for sealing either end in a longitudinal direction of a through-hole of the dried body using a sealant; degreasing step (S5) for removing organic ingredients from the sealed body; and sintering step (S6) to obtain a ceramic honeycomb structure by sintering the body after the organic ingredients are removed.

However, it is an option not to conduct drying step (S3), sealing step (S4) and degreasing step (S5) in the method for manufacturing a ceramic honeycomb structure. Namely, it is an option to conduct preparation step (S1) for preparing raw material paste by kneading titania particles, alumina particles and a binder ingredient, and forming step (S2) to form a body by shaping the raw material paste into a honeycomb structure, and directly afterward to conduct sintering step (S6) to form a ceramic honeycomb structure by sintering the body obtained by the above steps.

In the following, each step is described.

It is an option to conduct sealing step (S4) either after forming step (S2) or after a sintering step (S6).

In the following, each step is described.

Preparation of Raw Material Paste (S1)

In a preparation step, raw material paste is prepared by kneading titania particles, alumina particles and a binder ingredient. In a preparation step, raw material paste may also be prepared by kneading titania particles, alumina particles, mullite particles and a binder ingredient.

In the present application, titania particles indicate those containing only titania particles, and alumina particles indicate those containing only alumina particles. Mullite particles mean particles formed with alumina components and silicon dioxide components. Here, titania particles and alumina particles may also contain impurities. As for impurities, for example, silicon (Si), aluminum (Al), iron (Fe), calcium (Ca), magnesium (Mg), potassium (K), sodium (Na) and the like are listed.

A method for kneading particles and a binder ingredient is not limited specifically, and a mixer, a kneader, a media mixing mill (attritor), a pressure kneader (muller) or the like may be used for kneading.

Regarding titania particles and alumina particles, for example, it is an option to use titania particles and alumina particles as is, or they may be slurried using a dispersion medium such as water. Alternatively, mixed particles of titania particles and alumina particles may be used as described later. In addition, mullite particles may also be added to titania particles and alumina particles.

As for titania particles and alumina particles used in the preparation step, it is an option for titania particles and alumina particles in a precursor to be combined at an amount-of-substance ratio of titania to alumina in a range of 40:6~60:40, for example. It is also preferable to combine titania particles and alumina particles in a precursor at an amount-of-substance ratio of titania to alumina in a range of 45:55~55:45, for example. However, an amount-of-substance ratio here means a ratio of the amount of substance of titania to the amount of substance of alumina, not a ratio of the amount of substance of titania particles to the amount of substance of alumina particles. Therefore, if mullite particles are used when preparing a precursor, the amount-of-substance ratio of titania to alumina is obtained based on the sum of the alumina derived from alumina particles and the alumina derived from mullite particles. Therefore, when mullite particles are used in the preparation step, it is preferred to combine mullite particles with titania particles and alumina particles in an amount-of-substance ratio of titania to alumina that is within the above range.

When titania particles and alumina particles are combined in a preparation step, their weight ratio is, for example, in a range of 35:65~55:45, more preferably, 40:60~50:50. The amount of unreacted titania or alumina remaining after sintering is reduced if combined within such a range.

Particle diameters of titania particles and alumina particles are not limited specifically. For example, when particle diameters of titania particles and alumina particles are compared, it is an option to employ any of the following: the diameter of titania particles is greater than that of alumina particles; the diameter of titania particles is smaller than that of alumina particles; or the diameter of titania particles is substantially the same as that of alumina particles.

When alumina particles are used with titania particles having a particle diameter greater than that of alumina particles, it is referred to as a "first mode" in the following. In addition, when alumina particles are used with titania particles having a particle diameter smaller than that of alumina particles, it is referred to as a "second mode" and described in the following. Moreover, when alumina particles are used with titania particles having a particle diameter substantially the same as that of alumina particles, it is referred to as a "third mode" and described in the following.

As for the particle diameter of titania particles in the first mode, the mean volume particle diameter is 5 μm~20 μm, for example. Also, particles with a mean volume particle diameter of 8 µm~18 µm or the like may be used. Here, it is an option to use primary particles of titania particles or secondary particles which are aggregate primary particles, or to use a combination thereof.

In the present application, mean volume particle diameters are measured using a laser diffraction particle size distribution analyzer (Beckman Coulter Inc.).

As for the particle diameter of alumina particles in the first mode, the mean volume particle diameter is 2 µm~5 µm, for example.

In the present application, the type of alumina particles is not limited specifically. For example, α-alumina particles, γ-alumina particles, a combination of α-alumina particles and γ-alumina particles, or the like may be used. In addition, alumina particles may be either primary particles, secondary particles that are aggregate primary particles, or a combination thereof.

In the first mode, the ratio of particle diameters of titania particles and alumina particles is not limited specifically, and it may be in a range of 10:1~10:3, for example.

A second mode is described in the following, using alumina particles and titania particles having a smaller particle diameter than alumina particles.

As for the particle diameter of titania particles in the second mode, the mean volume particle diameter is 0.1 µm~0.8 µm or 0.2 µm~0.5 µm, for example.

As for the particle diameter of alumina particles in the second mode, the mean volume particle diameter is 2 µm~5 µm, for example.

In the second mode, the ratio of particle diameters of titania particles and alumina particles is not limited specifically, and it may be in a range of 1:4~1:10, for example.

A third mode is described in the following, using titania particles and alumina particles having substantially the same particle diameter as each other.

As for the particle diameter of titania particles in the third mode, the mean volume particle diameter is 1 µm~5 µm or 1 µm~3 µm, for example.

In the third mode, the mean volume particle diameter of alumina particles is 2 µm~5 µm, for example.

In the third mode, the ratio of particle diameters of titania particles and alumina particles is not limited specifically, and it may be in a range of 1.0:0.3~1:4, for example.

As for the particle diameter of mullite particles to be used in addition to titania particles and alumina particles when needed, the mean volume particle diameter is 0.1 µm~45 µm, for example. Alternatively, a mean volume particle diameter of 0.1 µm~20 µm, 0.5 µm~10 µm and so forth, for example, may also be used. When a body is sintered and aluminum titanate is formed, unreacted aluminum and silicon contained in mullite particles are thought to melt and work as a binder which fills spaces in aluminum titanate.

The mullite particles may be primary particles, secondary particles which are aggregate primary particles, or a combination thereof.

It is an option for the powder of titania particles (titania powder) containing titania particles used for a precursor to include impurities such as silicon (Si), aluminum (Al), iron (Fe), calcium (Ca), magnesium (Mg), potassium (K) and sodium (Na). In the present application, "titania particle powder" means bulk (material, raw material) of titania particles to be used in a method for manufacturing a ceramic honeycomb structure. Here, impurities in titania powder may be such that are contained inevitably during a process of manufacturing titania, or may be such that are mixed into titania powder separately. In addition to impurities that make solid solutions with titania particles, other impurities that are present outside titania particles of titania powder may also be included.

It is thought that those impurities contribute to suppressing aluminum titanate, which is manufactured using titania particles and alumina particles, from being decomposed into titania and alumina in a high temperature range, or to improving the mechanical strength of aluminum titanate.

The amount of impurities may be adjusted by controlling the amount of impurities contained in raw titania material such as $Ti(OH)_4$ (titania powder) or the like or by cleansing titania compounds by using acids, alkalis or the like.

The amount of iron in titania powder is preferred to be at a weight ratio of 200 ppm~1000 ppm in the titania powder based on $Fe_2O_3$. When the amount of iron in titania powder is in the above range, it is thought that aluminum titanate formed when part of $Al^{3+}$ is displaced by $Fe^{2+}$ is suppressed from being decomposed into titania and alumina in a high temperature range.

The amount of silicon in titania powder is preferred to be 0.1 wt. %~1.0 wt. % of the titania powder in terms of $SiO_2$. When the amount of silicon in titania powder is in the above range, it is thought that aluminum titanate formed when part of $Al^{3+}$ is displaced by $Se^{4+}$ is suppressed from being decomposed into titania and alumina in a high temperature range.

No magnesium is preferred to be contained in titania powder. When contained, the amount of magnesium in titania powder is preferred to be at a weight ratio of 500 ppm or lower in the titania powder in terms of MgO. Since MgO tends to absorb water, if MgO exists at particle boundaries among aluminum titanate particles, it is thought MgO may cause cracking when it expands because of moisture absorption. Thus, the amount of magnesium in titanate powder is preferred to be within the above range. Alternatively, it is further preferred that no magnesium, or substantially no magnesium (at or below the detection limit), be contained in titania powder.

The amount of potassium in titania powder is preferred to be at a weight ratio of 100 ppm~600 ppm in the titania powder in terms of $K_2O$. In addition, the amount of sodium contained in titania powder is preferred to be at a weight ratio of 200 ppm~1000 ppm in the titania powder in terms of $Na_2O$. It is thought that $K_2O$ and $Na_2O$ work as sintering additives for sinter bonding aluminum titanate particles to each other so as to suppress cracking at particle boundaries among aluminum titanate particles. Thus, the amounts of potassium and sodium in titania powder are preferred to be in the above ranges.

Combined particles of titania particles and alumina particles, or combined particles of titania particles, alumina particles and mullite particles are obtained by the following preconditioning treatment step.

Preconditioning Treatment

In a preconditioning treatment step, titania particles and alumina particles are made to come in contact with and adhere to each other to form a precursor (a particle contact body of titania particles and alumina particles). Accordingly, a precursor is formed where titania particles and alumina particles are homogenized and in contact with each other.

In the preconditioning treatment step, a precursor may also be formed by further adding a sintering additive to make it come in contact with titania particles and alumina particles (particle contact body of titania particles, alumina particles and particles of a sintering additive). As for sintering additives, mullite, zircornia, alkali feldspar, strontium feldspar and the like are listed.

In the present application, "homogenized" indicates that titania particles and alumina particles are present evenly based on the amounts of substance (at a molar ratio). It is more preferred that an amount-of-substance ratio of titania to alumina in a precursor be in a range of 40:60~60:40, for example. An amount-of-substance ratio here means a ratio of the amount of substance of titania to the amount of substance of alumina, not an amount-of-substance ratio of titania particles to alumina particles as described above. Therefore, when mullite particles or the like are used when forming a precursor, an amount-of-substance ratio of titania to alumina is derived based on the sum (total amount of substance of alumina) of alumina derived from alumina particles and alumina derived from mullite particles.

To have titania particles and alumina particles come in contact with each other in the above-described first mode, the following, for example, may be employed: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water, and then titania particles are immersed in the aqueous dispersion of alumina particles; or a method in which a mixture of titania particles and alumina particles is slurried and then dried while being mixed.

As for a method in which a mixture containing titania particles and alumina particles is spray-dried, for example, a mixture containing titania particles and alumina particles is slurried and spray-dried so that titania particles and alumina particles are homogenized.

In addition, as for another method of spray drying, for example, a binder ingredient to be used in a later-described preparation step is further added to the mixture containing titania particles and alumina particles at 5%~10% by mass based on the entire mass of titania particles, and then the mixture is spray-dried.

As for a method in which titania particles and alumina particles are granulated through a rolling motion, for example, titania particles, alumina particles and water are placed into an oscillating granulator and then put into a rolling motion to prepare a precursor; titania particles and water are placed into an oscillating granulator and put into a rolling motion, then alumina particles are added to the oscillating granulator and put into a rolling motion so that a precursor is prepared; and so forth. In such cases, a ratio of 5~10% by mass of water based on the entire mass of titania particles is used. Moreover, it is an option to use a binder ingredient (such as methylcellulose) along with water. A ratio of 5~10% by mass of a binder ingredient based on the entire mass of titania particles may be used.

As for a method in which titania particles are immersed in an aqueous dispersion of alumina particles, for example, alumina particles are dispersed in a dispersion medium such as water to obtain an aqueous dispersion of alumina particles, titania particles are immersed in the aqueous dispersion of alumina particles, and then a precursor, in which titania particles and alumina particles are homogenized and in contact with each other, is lifted from the aqueous dispersion of alumina particles.

As for a method in which a mixture containing titania particles and alumina particles is slurried and then dried while being mixed, for example, titania particles and alumina particles are slurried using a volatile solvent or the like to form a homogeneous mixture, which is then dried while being mixed.

By conducting a preconditioning treatment step in the first mode, when alumina particles are combined with titania particles having a particle diameter greater than alumina particles, it is easier to form a precursor where multiple alumina particles are in contact with the surface of a titania particle.

Also, in the above-described second mode, to have titania particles and alumina particles come in contact with each other, the following may be employed, for example: a method in which a mixture containing titania particles and alumina particles is spray-dried; a method in which titania particles and alumina particles are granulated through a rolling motion; a method in which an aqueous dispersion of titania particles is formed by dispersing titania particles in a dispersion medium such as water, and then alumina particles are immersed in the aqueous dispersion of titania particles; or a method in which a mixture of titania particles and alumina particles is slurried and then dried while being mixed. As for a method for granulating titania particles and alumina particles through a rolling motion, a precursor may also be prepared when alumina particles and water are placed into an oscillating granulator, put into a rolling motion, and then titania particles are added into the oscillating granulator and put into a rolling motion.

By performing preconditioning treatment step in the second mode, it is easier to form a precursor where titania particles make contact with the surface of an alumina particle.

In the third mode, to have titania particles and alumina particles come in contact with each other, the following may be employed, for example: a method in which a mixture containing titania particles and alumina particles is spray-dried; a method in which titania particles and alumina particles are granulated through a rolling motion; a method in which an aqueous dispersion of alumina particles is formed by dispersing alumina particles in a dispersion medium such as water, and then titania particles are immersed in the aqueous dispersion of alumina particles; a method in which an aqueous dispersion of titania particles is formed by dispersing titania particles in a dispersion medium such as water, and then alumina particles are immersed in the aqueous dispersion of titania particles; or a method in which a mixture of titania particles and alumina particles is slurried and then dried while being mixed.

In the third mode, titania particles with a particle diameter substantially the same as that of alumina particles are combined with alumina particles in the preconditioning treatment step. That makes it easier to obtain a mixture of a precursor where multiple alumina particles are in contact with the surface of a titania particle, a precursor where multiple titania particles are in contact with the surface of an alumina particle, and the like.

In the preconditioning treatment step, the obtained precursor will not be sintered directly after the preconditioning treatment step. Uniform particle diameters of a precursor are thought to be easier to form while the precursor and a binder ingredient can be kneaded in a short period of time.

By doing such a preconditioning treatment step, titania particles and alumina particles are more likely to come in contact. Accordingly, precursor 7 is formed, where alumina particles 9 make contact with titania particle 8 to cover its surface, for example (FIG. 6).

Figure 5:
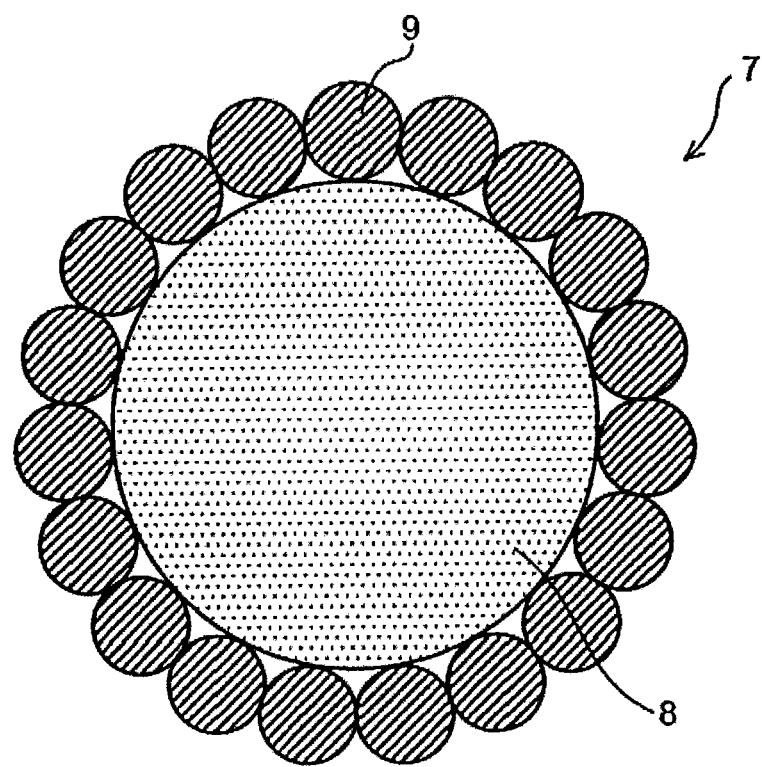
FIG. 5 is a view schematically showing an example of a precursor made of titania particles and alumina particles.
Figure 6:
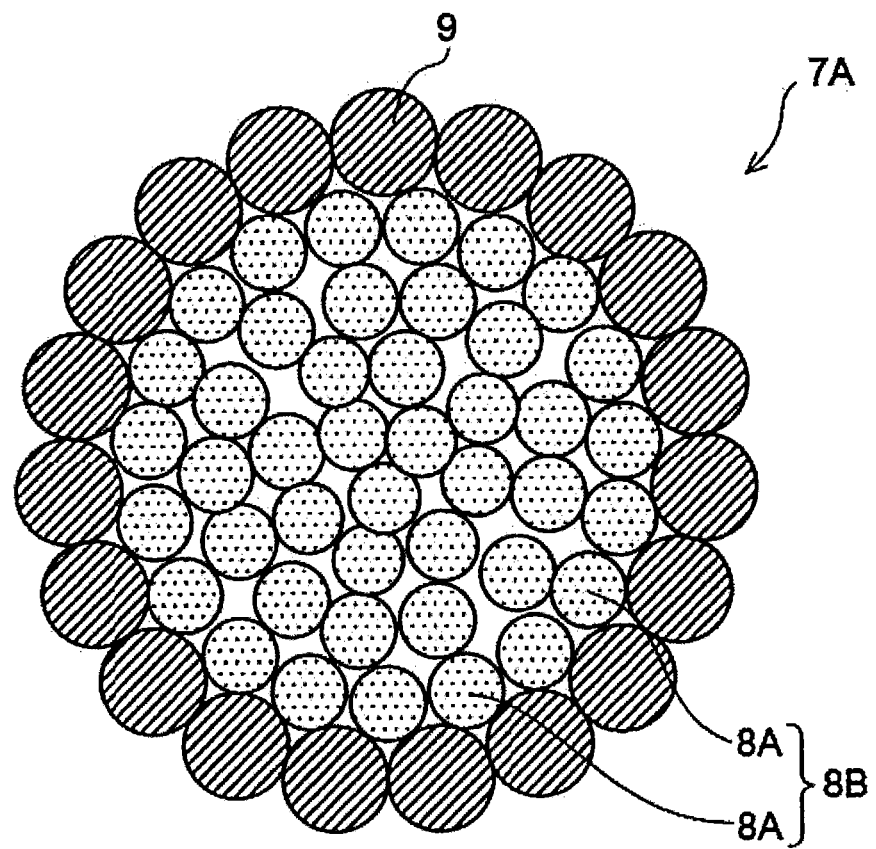
FIG. 6 is a view schematically showing another example of a precursor made of titania particles and alumina particles.

FIG. 6 shows a state where titania particle 8 is covered with alumina particles 9. That is an example of a precursor. Here, the state of a precursor is not limited to such a size relationship between titania particles and alumina particles as shown in FIG. 5, and another state may be employed, where the size of alumina particles is greater than that of titania particles and the surface of an alumina particle is covered with titania particles. In addition, yet another state may be employed, where the size of titania particles is substantially the same as that of alumina particles.

Also, when an aggregate of primary particles is used for titania particles, titania particles and alumina particles are more likely to come in contact with each other by performing a preconditioning step as described above. For example, as shown in FIG. 6, a precursor (7A) is formed, where titania particles (secondary particles) (8B) made of aggregate titania particles (primary particles) (8A) are covered with alumina particles 9.

In the present application, a "precursor" means a granular material where titania particles and alumina particles make contact with and adhere to each other.

When titania particles, alumina particles and mullite particles make contact with and adhere to each other, a precursor (a particle contact body of titania particles, alumina particles and mullite particles) is formed by the same methods described above for having titania particles and alumina particles come in contact with each other.

To have titania particles, alumina particles and mullite particles come in contact with each other, the following may be employed, for example: a method in which a mixture containing titania particles, alumina particles and mullite particles is spray-dried; a method in which titania particles, alumina particles and mullite particles are granulated through a rolling motion; a method in which a mixed aqueous dispersion of alumina particles and mullite particles is formed by dispersing alumina particles and mullite particles in a dispersion medium such as water, and then titania particles are immersed in the mixed aqueous dispersion; and a method in which a mixture of titania particles, alumina particles and mullite particles is slurried and then dried while being mixed.

As for a binder ingredient, the following may be listed: celluloses such as methylcellulose, carboxymethyl cellulose and sodium carboxymethyl cellulose; alcohols such as polyvinyl alcohol; salts such as lignosulfonate; waxes such as paraffin wax and microcrystalline wax; thermoplastic resins such as EVA, polyethylene, polystyrene, liquid-crystal polymer and engineering plastics.

The amount of a binder ingredient to be added is 0.1%~20% by mass based on 100% by mass of a precursor, for example. It may be 1%~15% by mass, for example.

To prepare raw material paste, other ingredients may be added to a precursor and a binder ingredient.

As for other ingredients, pore-forming agents, lubricants, plasticizers, dispersing agents, solvents and the like are listed.

For pore-forming agents, the following are listed: carbon materials such as graphite; resins such as polyethylene, polypropylene and polymethylmethacrylate; plant-based materials such as starch, nut shells, walnut shells and corn; ice; dry ice; and the like.

The amount of a pore-forming agent to be added is 0.1%~30% by mass based on 100% by mass of a precursor. It may be 1%~20% by mass, for example.

For lubricants and plasticizers, the following are listed, for example: alcohols such as glycerin; higher fatty acids such as caprylic acid, lauric acid, palmitic acid, alginic acid, oleic acid and stearic acid; and metal stearate such as aluminum stearate.

The amount of a lubricant or plasticizer to be added is 0.01%~5% by mass based on 100% by mass of a precursor. It may be 0.1%~1% by mass.

As for dispersing agents, for example, the following are listed: inorganic acids such as nitric acid, hydrochloric acid and sulfuric acid; organic acids such as oxalic acid, citric acid, acetic acid, malic acid and lactic acid; alcohols such as methanol, ethanol and propanol; surfactants such as ammonium polycarboxylate and polyoxyalkylene alkyl ether; and so forth.

The amount of a dispersing agent to be added is 0.01%~10% by mass based on 100% by mass of a precursor. It may be 0.05%~2% by mass.

As for solvents, the following are listed, for example: alcohols such as methanol, ethanol, butanol and propanol; glycols such as propylene glycol, polypropylene glycol and ethylene glycol; water; and the like.

The amount of a solvent to be used is 0.1%~50% by mass. It may be 10%~40% by mass.

Forming of Honeycomb Structural Body (S2)

In a forming step, raw material paste is shaped into a body with a honeycomb structure.

In the forming step, raw material paste is extruded through a die to form a body with a honeycomb structure, then the body is supported by a holder to move in the direction of extrusion. The speed of moving a body by a holder relative to the speed of extruding raw material paste through the die is adjusted in accordance with the diameter size set for the body.

Forming of Honeycomb Structural Body (First Embodiment)

In the following, a forming step of a first embodiment is described in detail.

FIG. 7 is a view schematically showing an example of the structure of an extrusion apparatus to be used in the forming step according to the first embodiment of the present invention.

Figure 8A:
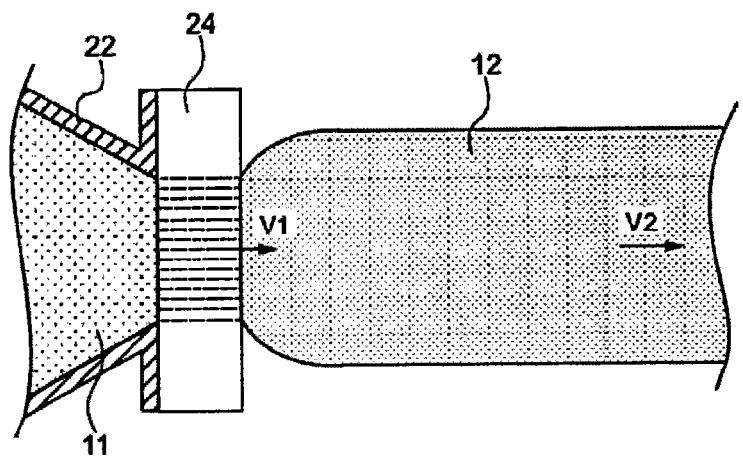
FIG. 8A is a view schematically illustrating a forming step according to the first embodiment of the present invention.
Figure 8B:
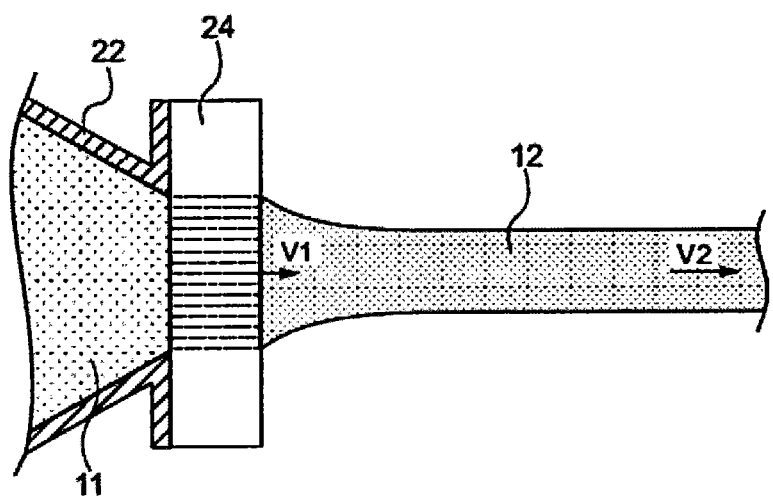
FIG. 8B is a view schematically illustrating a forming step according to the first embodiment of the present invention.

FIGS. 8A and 8B are schematic views to illustrate a forming step in the first embodiment of the present invention.

As shown in FIG. 7, extrusion apparatus 10 to be used in the forming step of the first embodiment has the following, for example: extruder 20 which extrudes raw material paste 11 in a horizontal direction to shape the paste; and belt conveyor 30 which is positioned downstream in a direction of extruding raw material paste 11 by extruder 20 and which transfers extruded body 12 in the extrusion direction (namely, in a horizontal direction).

Extruder 20 is equipped with cylinder 22 having input port 21 for raw material paste 11, screw 23 to be inserted into cylinder 22, and die 24 positioned at an end of cylinder 22.

On the downstream side of an extrusion direction of raw material paste 11 by extruder 20, for example, the following are positioned: cutter 31 (such as a wire cutter or the like) to cut body 12 extruded from extruder 20 to a predetermined length; speed sensor 32 (such as a laser surface velocimeter) to detect extrusion speed (V1) at which raw material paste 11 is extruded through die 24 from extruder 20; and speed sensor 33 (such as a laser surface velocimeter) to detect moving speed (V2) of body 12 by belt conveyor 30.

In a forming step of the first embodiment using extrusion apparatus 10, raw material paste 11 is put into cylinder 22 from input port 21, for example. Next, raw material paste 11 put into cylinder 22 is blended and transported by screw 23. While being blended and transported by screw 23, raw material paste 11 is extruded in a horizontal direction through die 24 to be shaped into a honeycomb structure.

Next, while a lower surface of body 12 is supported by belt conveyor 30, body 12 is moved in the extrusion direction (namely, a horizontal direction). Specifically, for example, body 12 is moved (transported) by belt conveyor 30 while still connected to the body 12 that has just been extruded through die 24.

Then, during the forming step of the first embodiment, moving speed (V2) of body 12 by belt conveyor 30 relative to extrusion speed (V1) of raw material paste 11 through die 24 is changed in accordance with the diameter size set for body 12.

When moving speed (V2) of body 12 is changed, body 12 will have a different diameter size from the diameter of the body 12 that has just been extruded through die 24. Also, due to such a difference in moving speed (V2) of body 12, not only the diameter size but also the thickness of the partitions of body 12 differs from those of the body 12 that has just been extruded through die 24.

Namely, if moving speed (V2) of body 12 by belt conveyor 30 is reduced relative to extrusion speed (V1) of raw material paste 11, force is exerted on body 12 immediately after it is extruded in a direction opposite the extrusion direction of raw material paste 11. Then, due to such compression force, body 12 shrinks in a longitudinal direction and its diameter size is enlarged immediately after it is extruded as shown in FIG. 8A. Also, when compression force is added to body 12 immediately after it is extruded, the partitions of body 12 become thicker because body 12 shrinks in a longitudinal direction.

If moving speed (V2) of body 12 by belt conveyor 30 is increased relative to extrusion speed (V1) of raw material paste 11, force is exerted on body 12 immediately after it is extruded in the extrusion direction of raw material paste 11. Then, as shown in FIG. 8B, body 12 is elongated in a longitudinal direction due to such tensile force, and its diameter becomes smaller immediately after it is extruded. Also, when tensile force is exerted on body 12 immediately after it is extruded, the partitions of body 12 become thinner because body 12 is elongated in a longitudinal direction.

Therefore, in the forming step of the first embodiment, to form body 12 with a diameter greater than that of the body 12 that has just been extruded through die 24, moving speed (V2) of body 12 by belt conveyor 30 is set slower than extrusion speed (V1) of raw material paste 11. The same procedure applies when forming body 12 whose partitions are thicker than those of the body 12 that has just been extruded through die 24.

To form body 12 with a diameter smaller than that of the body 12 that has just been extruded through die 24, moving speed (V2) of body 12 by belt conveyor 30 is set faster than extrusion speed (V1) of raw material paste 11. The same procedure applies when forming body 12 whose partitions are thinner than those of the body 12 that has just been extruded through die 24.

When raw material paste 11 is extruded through die 24, the diameter of body 12 immediately after being extruded is slightly greater than die 24 (in particular, its slit aperture) because of the extrusion force.

Accordingly, to form body 12 with the same diameter size as the die (in particular, its slit aperture), moving speed (V2) of body 12 by belt conveyor 30 is set faster than extrusion speed (V1) of raw material paste 11.

Here, extrusion speed (V1) of raw material paste 11 is preferred to be set, for example, in a range of 3 mm/sec.~70 mm/sec. depending on the composition and properties (such as viscosity) of raw material paste 11. It may also be in a range of 5 mm/sec.~18 mm/sec.

Desired extrusion speed (V1) is set, for example, by using speed sensor 32 to detect the extrusion speed of body 12 immediately after it is extruded through die 24, and by controlling the rotation speed of screw 23 based on the detected result.

On the other hand, moving speed (V2) of body 12 by belt conveyor 30 is preferred to be set in a range of 3 mm/sec.~70 mm/sec., for example. It may also be in a range of 5 mm/sec.~18 mm/sec. In addition, moving speed (V2) of body 12 is preferred to be set within ±30% of extrusion speed (V1) of raw material paste 11, for example. It may also be set within ±5%.

Desired moving speed (V2) is set, for example, by detecting the moving speed of body 12 transported on belt conveyor 30 using speed sensor 33, and by controlling the rotation speed of the belt (its drive rollers) of belt conveyor 30 based on the detected result. Desired moving speed (V2) may also be set by directly controlling the rotation speed of the belt (its drive rollers) of belt conveyor 30 without using speed sensor 33.

In the forming step of the first embodiment using extrusion apparatus 10 described so far, body 12 being transported by belt conveyor 30 is cut by cutter 31 so that bodies 12 with a predetermined length are obtained.

In the forming step of the first embodiment, when moving speed (V2) of body 12 by belt conveyor 30 is increased relative to the extrusion speed of raw material paste 11, tensile force in the extrusion direction of raw material paste 11 is exerted on body 12 immediately after it is extruded as described above. Accordingly, body 12 is prevented from having wavy surfaces caused by resistance which raw material paste 11 receives when passing through die 24 during the extrusion process.

Forming of Honeycomb Structural Body (Second Embodiment)

The forming step of a second embodiment is described while omitting the contents overlapping the forming step of the first embodiment.

Figure 9:
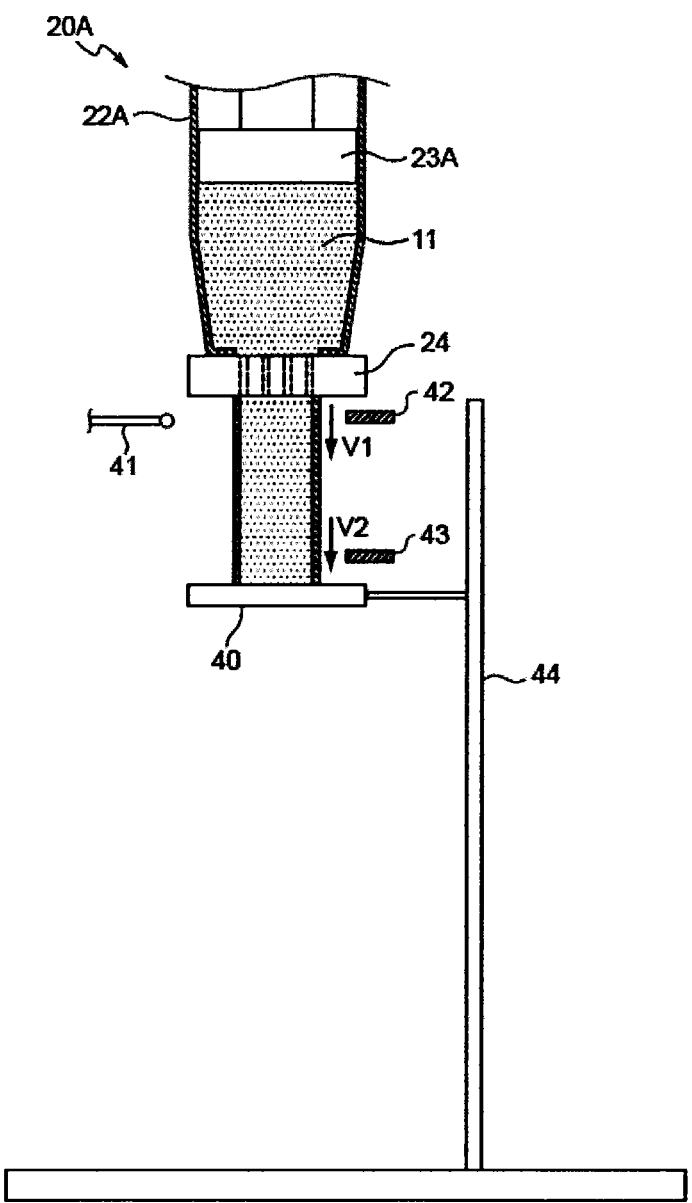
FIG. 9 is a view schematically showing an example of an extrusion apparatus to be used according to a second embodiment of the present invention.

FIG. 9 is a view schematically showing an example of the structure of an extrusion apparatus to be used in the forming step of a second embodiment of the present invention. In FIG. 9, the same reference number is assigned to the same member as that in extrusion apparatus 10 shown in FIG. 7. An example of a plunger-type extrusion apparatus is shown in FIG. 9; however, a screw-type extrusion apparatus as shown in FIG. 7 may also be used.

As shown in FIG. 9, extrusion apparatus (10A) to be used in a forming step of the second embodiment is equipped with, for example, extruder (20A) which extrudes raw material paste downward in a vertical direction and shapes it, and holder 40 which is positioned on the downstream side of extruder (20A) in the extrusion direction (downward side of die 24) and which transports extruded body 12 along the extrusion direction (downward in a vertical direction).

Extrusion apparatus (10A) is equipped with, for example, extruder (20A) which extrudes raw material paste 11 downward in a vertical direction and shapes it. Extruder (20A) includes cylinder (22A), one end of which faces in the direction of gravity, and piston (23A) inserted into cylinder (22A). Die 24 is positioned at an end of cylinder (22A). The rest is the same as the structure of extruder 20 shown in FIG. 7.

Holder 40 is positioned to be connected to elevator 44.

On the downstream side of extruder (20A) in the extrusion direction (downward side of die 24), the following are positioned, for example: cutter 41 (such as a wire cutter) to cut body 12 extruded from extruder (20A) to a predetermined length; speed sensor 42 (such as a laser surface velocimeter) to detect extrusion speed (V1) at which raw material paste 11 is extruded from extruder (20A) through die 24; and speed sensor 43 (such as a laser surface velocimeter) to detect moving speed (V2) at which body 12 is moved by holder 40.

In the forming step of the second embodiment using extrusion apparatus (10A), raw material paste 11 is extruded through die 24 downward in a vertical direction and shaped into a honeycomb structure, for example, when pressure is added from a kneading motion by a screw (not shown) positioned in a prior section of the extrusion apparatus and from piston (23A) shown in FIG. 9.

Next, body 12 is moved along the extrusion direction (namely, downward in a vertical direction) while the lower-end surface of body 12 is supported by holder 40. Specifically, body 12 is transported by holder 40, for example, by lowering holder 40 using elevator 44 and moving body 12 downward (lowering) while supporting the lower-end surface of body 12, which is suspended in the direction of gravity from the cylinder while still connected to the body 12 that has just been extruded through die 24.

Then, according to the desired diameter size of body 12, moving speed (V2) of body 12 by holder 40 is changed relative to extrusion speed (V1) of raw material paste 11 through die 24.

In the forming step of the second embodiment, the same as that of the first embodiment, when moving speed (V2) of body 12 is changed, body 12 will have a different diameter size from that of the body 12 that has just been extruded through die 24. Also, due to such difference in moving speed (V2) of body 12, the thickness of partitions of body 12 is different from that of the body 12 that has just been extruded through die 24.

The ranges for extrusion speed (V1) of raw material paste 11 and moving speed (V2) of body 12 as well as the relationship between such ranges are the same as in the first embodiment.

However, in the forming step of the second embodiment, the extrusion direction of raw material paste 11 is set downward in a vertical direction, namely, in the direction of gravity. Thus, tensile force derived from its own weight will be exerted on extruded body 12 in the direction of gravity. Accordingly, moving speed (V2) of body 12 by holder 40 is set considering the tensile force in the direction of gravity derived from its own weight. In particular, the speed of descent of extruded body 12 is controlled by the descending speed of holder 40, and moving speed (V2) of body 12 is set accordingly.

In the forming step of the second embodiment using extrusion apparatus (10A) described above, body 12 being lowered by holder 40 is cut by cutter 41 to form bodies 12 at a predetermined length.

Drying (S3)

In the drying step, a body shaped from the raw material paste is dried.

Dryers for a drying step are not limited to any specific type, and the following are listed: microwave dryers, hot-air dryers, dielectric heating dryers, reduced-pressure dryers, vacuum dryers, freeze dryers and the like.

The duration and temperature for drying are set appropriately according to the volume or the like of a honeycomb body.

Sealing of Through Holes (S4)

In a sealing step, either end of a through-hole of the dried body in a longitudinal direction is sealed using a sealant.

Application of a sealant to a honeycomb body is not limited specifically. There are methods such as immersing an end surface of a body in sealant slurry, injecting a sealant into a through-hole from an end surface using an injector, and the like.

As for a sealant, it is not limited to any specific type. For example, raw material paste made of titania particles and alumina particles, or made of other ceramic, may be used.

Sealant slurry is prepared by adding a binder ingredient, water or the like to titania particles and alumina particles, for example. The viscosity of sealant slurry is adjusted properly according to the type and the like of the sealant.

A sealing step may also be conducted after a sintering step.

Degreasing of Honeycomb Structural Body (S5)

In a degreasing step, organic ingredients are removed from the sealed body.

Conditions for removing organic ingredients from the sealed honeycomb body are not limited specifically, and may be selected appropriately according to the type and amount of organic ingredients contained in the honeycomb body. For example, degreasing is conducted at 150° C.~800° C. for two hours.

Sintering of Honeycomb Structural Body (S6)

In a sintering step, a ceramic honeycomb structure is obtained by sintering a body from which organic ingredients have been removed.

Sintering is not limited to any specific method and is conducted using a sintering furnace such as an electric tube furnace, electric box furnace, tunnel kiln, far infrared furnace, microwave heater, shaft kiln, reverberatory furnace, rotary-hearth furnace or roller-hearth furnace.

As for sintering methods, a body may be sintered batch by batch or continuously. Alternatively, a body may be settled or circulated while being sintered.

The sintering temperature is 1350° C. or higher, for example, and it may be set at 1400° C. or higher. In addition, the sintering temperature is 1650° C. or lower, for example, and it may be set at 1550° C. or lower.

The programmed rate of the sintering temperature is not limited specifically, and it may be set at 1° C./hour~500° C./hour, for example.

Sintering a honeycomb body is conducted under oxygen atmosphere such as atmospheric air, for example.

The duration for sintering a honeycomb body differs depending on the amount of raw material paste, the type of sintering furnace, the sintering temperature, the sintering atmosphere and the like. It may be set for 10 minutes~24 hours, for example.

Ceramic Body Having Honeycomb Structure

A ceramic honeycomb structure according to an embodiment of the present invention is obtained by a manufacturing method that includes a preparation step for preparing raw material paste by kneading titania particles, alumina particles and a binder ingredient, and a forming step for shaping a body into a honeycomb structure by extruding raw material paste through a die while moving a body in the extrusion direction by supporting the body with a holder. In such a forming step, the speed of moving a body by a holder relative to the speed of extruding raw material paste through a die is changed in accordance with the diameter size set for the body, and then a sintering step is conducted for sintering the body to obtain a ceramic honeycomb structure.

When an element analysis is performed on the obtained ceramic body using a scanning electron microscope (S-4800, Hitachi, Ltd.) and an energy dispersive X-ray spectrometer (EMAX Energy EX-250, Horiba, Ltd.), the ratio (weight ratio) of titania and alumina in a ceramic body is preferred to be in a range of 7:10~4:10, more preferably in a range of 6:10~5:10.

In addition, it is preferred that titania be contained at 15 wt. %~50 wt. % and alumina at 45 wt. %~70 wt. % based on the entire weight of the obtained ceramic body; more preferably, titania at 22 wt. %~40 wt. % and alumina at 55 wt. %~65 wt. %. Furthermore, it is an option for silica to be contained at 1 wt. %~20 wt. % or 3 wt. %~15 wt. % based on the entire weight of the obtained ceramic body.

Partitions of a ceramic body with a honeycomb structure can function as a filter to capture particulate matter (PM).

Therefore, a ceramic honeycomb structure can function, for example, as a diesel particulate filter (DPF) or the like.

EXAMPLES

Examples are shown in the following to further describe the present invention in detail. However, the present invention is not limited to such examples.

Example 1

Eight parts by weight of titania particles with a mean volume particle diameter of 12 µm (brand name $TiO_2$ 3020 (registered mark), Kronos Incorporated), 10 parts by weight of alumina particles with a mean volume particle diameter of 3 µm (brand name $Al_2O_3$ RMA (registered mark), Alcan Inc.), and 40 parts by weight of water are placed into a spray dryer (G8210-A, Yamato Scientific Co., Ltd.) and spray dried to form a precursor.

The precursor, 6 parts by weight of alumina particles, 3 parts by weight of silicon dioxide, 20 parts by weight of pore-forming graphite (brand name A625, Asbury Graphite Mills, Inc.) and 4.5 parts by weight of methyl cellulose (brand name METOLOSE 60SH, Shin-Etsu Chemical Co., Ltd.) are placed into a kneader (brand name Mix Muller, Shinto Kogyo K.K.) and kneaded to prepare raw material paste.

The obtained raw material paste is extruded through a honeycomb die by extruding the raw material paste in a horizontal direction using an extruder, shaped into a honeycomb structure, and transported by a belt conveyor as the body is extruded through the die while it is still connected at the die. Then, the body on the belt conveyor is cut to a desired length using a wire cutter.

During that time, the speed of extruding raw material paste and the speed of moving the body by the belt conveyor are both set at 8 mm/sec., and a body with a honeycomb structure is formed to have approximately 100 cpsi (approximately 15.5 cell/$cm^2$) and a partition thickness of approximately 0.45 mm. The raw material paste is shaped into a body with an outer diameter of 150 mm and a length of 150 mm.

Next, the speed of moving a body by a belt conveyor is changed to 6 mm/sec., which is slower than the speed of extruding the raw material paste (8 mm/sec.), and a body with an outer diameter of 155 mm and length of 150 mm is formed to have a honeycomb structure with approximately 93.7 cpsi (approximately 14.5 cell/$cm^2$) and a partition thickness of approximately 0.465 mm.

Next, the speed of moving a body by a belt conveyor is changed to 10 mm/sec., which is faster than the speed of extruding the raw material paste (8 mm/sec.), and a body with an outer diameter of 145 mm is formed to have a honeycomb structure with approximately 107 cpsi (approximately 16.6 cell/$cm^2$) and a partition thickness of approximately 0.435 mm.

Accordingly, by changing the speed of moving a body by a belt conveyor relative to the speed of extruding raw material paste, bodies with different diameters are obtained using a die of one size.

Then, the obtained body is dried for 20 minutes using both microwave (2.45 GHz, 20 kW) and hot air (140° C., air speed of 1 m/s).

Next, sealant slurry is prepared from the same raw material paste as was used for the honeycomb body.

Masking films are put on both end surfaces of the dried body. Then, the masking films are bored into a checkered pattern so that the ceramic body with a honeycomb structure obtained after sintering is sealed in checkered patterns which are complementary on one end surface and on the other end surface of the ceramic body. Accordingly, a sealed body is formed. As for masking film, a tape with an adhesive layer (adhesive power of 5.3 N/cm) made by forming acrylic adhesive on a polyester base is used.

The portion from an end sealed with masking film to a point 5 mm upward in a longitudinal direction of a dried body is immersed into sealant slurry. Then, the body is lifted from the sealant slurry. In the same manner, the other end of the body in a longitudinal direction is also immersed into the sealant slurry and lifted from the sealant slurry. Accordingly, a sealed body is obtained.

Under atmospheric air, the sealed body is heated from room temperature to 200° C. at a programmed rate of 40° C./hour; when the temperature has reached 200° C., it is heated to 300° C. at a programmed rate of 10° C./hour; when the temperature has reached 300° C., it is heated to 450° C. at a programmed rate of 40° C./hour; the temperature is kept at 450° C. for 5 hours to degrease the body; and it is heated at a programmed rate of 500° C./hour to 1450° C., where it is kept for 5 hours to sinter the body. Accordingly, ceramic bodies with a honeycomb structure having three different diameter sizes are obtained.

An element analysis is performed on the obtained ceramic bodies using a scanning electron microscope (S-4800, Hitachi, Ltd.) and an energy dispersive X-ray spectrometer (EMAX Energy EX-250, Horiba, Ltd.). As a result, the ratio (weight ratio) of titania and alumina in the ceramic bodies is found to be in a range of 6:10~5:10.

Example 2

The raw material paste obtained in Example 1 is extruded through a honeycomb die using an extruder which extrudes raw material paste downward in a vertical direction, shaped into a honeycomb structure, and lowered by a holder while the extruded body is still connected at the die. Then, the body on the holder is cut to a length using a wire cutter.

During that time, the speed of extruding raw material paste and the speed of moving the body by the holder are both set at 8 mm/sec. and a body with a honeycomb structure is formed to have approximately 100 cpsi (approximately 15.5 cell/$cm^2$) and a partition thickness of approximately 0.45 mm. The raw material paste is shaped into a body with an outer diameter of 150 mm and a length of 150 mm.

Next, the speed of moving the body by the holder is changed to 6 mm/sec., which is slower than the speed of extruding raw material paste (8 mm/sec.), and a body with an outer diameter of 155 mm and a length of 150 mm is formed to have a honeycomb structure with approximately 93.7 cpsi (approximately 14.5 cell/$cm^2$) and a partition thickness of approximately 0.465 mm.

Next, the speed of moving the body by the holder is changed to 10 mm/sec., which is faster than the speed of extruding raw material paste (8 mm/sec.), and a body with an outer diameter of 145 mm and a length of 150 mm is formed to have a honeycomb structure with approximately 107 cpsi (approximately 16.6 cell/$cm^2$) and a partition thickness of approximately 0.435 mm.

As described above, the speed of moving a body by a holder is changed relative to the speed of extruding raw material paste so that bodies with different diameters are obtained using a die of one size.

Then, the same as in Example 1, the obtained bodies are dried, sealed, degreased and sintered to form ceramic bodies with a honeycomb structure with three different diameter sizes.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a ceramic honeycomb structure, comprising:

kneading titania particles, alumina particles and a binder such that a raw material paste comprising the titania particles, the alumina particles and the binder is prepared;

extruding the raw material paste through a die for forming a honeycomb structure such that a body comprising the raw material paste and having the honeycomb structure is formed;

supporting the body extruded from the die on a holder while moving the holder along an extrusion direction of the raw material such that a diameter of the body held by the holder changes to a target diameter size;

sintering the body having the honeycomb structure with the target diameter size such that a ceramic body having the honeycomb structure with the target diameter size is formed; and forming a precursor comprising particles comprising titania particles and alumina particles, wherein the target diameter size is set different from the diameter of the body extruded from the die, the holder is moved at a moving speed which is determined based on the target diameter size and an extruding speed of the raw material paste from the die, the kneading comprises kneading the binder ingredient and the particles of the precursor comprising the titania particles and the alumina particles, and the forming of the precursor includes spray-drying the alumina particles onto the titania particles.

2. The method for manufacturing a ceramic honeycomb structure according to claim 1, wherein the extruding of the raw material paste comprises extruding the raw material paste in a horizontal direction through the die.

3. The method for manufacturing a ceramic honeycomb structure according to claim 1, wherein the extruding of the raw material paste comprises extruding the raw material paste in a horizontal direction through the die, and the holder for supporting the body extruded from the die is a belt conveyor.

4. The method for manufacturing a ceramic honeycomb structure according to claim 1, wherein the extruding of the raw material paste comprises extruding the raw material paste downward in a vertical direction through the die.

5. The method for manufacturing a ceramic honeycomb structure according to claim 1, wherein the extruding of the raw material paste comprises extruding the raw material paste downward in a vertical direction through the die, and the supporting of the body comprises supporting a lower-end surface of the body on the holder moving in the extrusion direction.

6. The method for manufacturing a ceramic honeycomb structure according to claim 1, wherein the moving speed is less than the extruding speed such that the diameter of the body extruded from the die is increased to the target diameter size.

7. The method for manufacturing a ceramic honeycomb structure according to claim 1, wherein the moving speed is greater than the extruding speed such that the diameter of the body extruded from the die is reduced to the target diameter size.

8. The method for manufacturing a ceramic honeycomb structure according to claim 1, further comprising drying the body having the honeycomb structure with the target diameter size prior to the sintering.

9. The method for manufacturing a ceramic honeycomb structure according to claim 1, further comprising applying a sealant material to one end of each of through-holes in the honeycomb structure of the body such that each of the through-holes in the honeycomb structure of the body is sealed at the one end.

10. The method for manufacturing a ceramic honeycomb structure according to claim 1, further comprising degreasing the body having the honeycomb structure with the target diameter such that an organic ingredient is removed from the body.

11. A ceramic honeycomb structural body produced by the method for manufacturing a ceramic honeycomb structure according to claim 1.

12. The method for manufacturing a ceramic honeycomb structure according to claim 2, wherein the moving speed is less than the extruding speed such that the diameter of the body extruded from the die is increased to the target diameter size.

13. The method for manufacturing a ceramic honeycomb structure according to claim 2, wherein the moving speed is greater than the extruding speed such that the diameter of the body extruded from the die is reduced to the target diameter size.

14. The method for manufacturing a ceramic honeycomb structure according to claim 2, further comprising drying the body having the honeycomb structure with the target diameter size prior to the sintering.

15. The method for manufacturing a ceramic honeycomb structure according to claim 3, wherein the moving speed is less than the extruding speed such that the diameter of the body extruded from the die is increased to the target diameter size.

16. The method for manufacturing a ceramic honeycomb structure according to claim 3, wherein the moving speed is greater than the extruding speed such that the diameter of the body extruded from the die is reduced to the target diameter size.

17. The method for manufacturing a ceramic honeycomb structure according to claim 4, wherein the moving speed is less than the extruding speed such that the diameter of the body extruded from the die is increased to the target diameter size.

18. The method for manufacturing a ceramic honeycomb structure according to claim 4, wherein the moving speed is greater than the extruding speed such that the diameter of the body extruded from the die is reduced to the target diameter size.

19. The method for manufacturing a ceramic honeycomb structure according to claim 4, further comprising drying the body having the honeycomb structure with the target diameter size prior to the sintering.

20. The method for manufacturing a ceramic honeycomb structure according to claim 5, wherein the moving speed is less than the extruding speed such that the diameter of the body extruded from the die is increased to the target diameter size.

21. The method for manufacturing a ceramic honeycomb structure according to claim 5, wherein the moving speed is greater than the extruding speed such that the diameter of the body extruded from the die is reduced to the target diameter size.

* * * * *